June 10, 1958 — R. A. VAN FOSSEN — 2,838,154
FLEXIBLE CONVEYER CHUTE
Filed July 26, 1956 — 3 Sheets-Sheet 1

INVENTOR.
RALPH A. VAN FOSSEN
BY
ATTORNEY

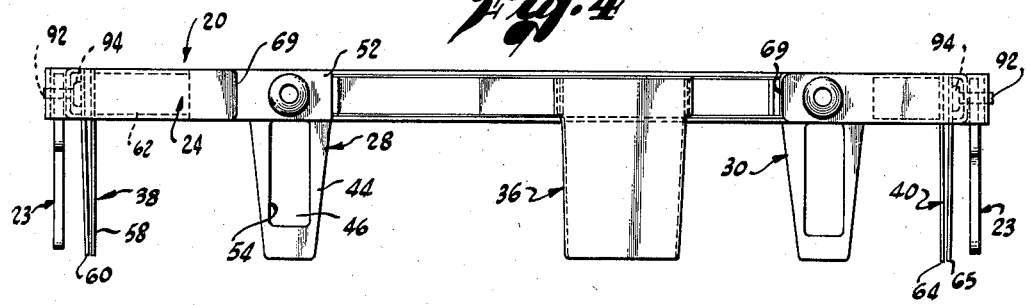
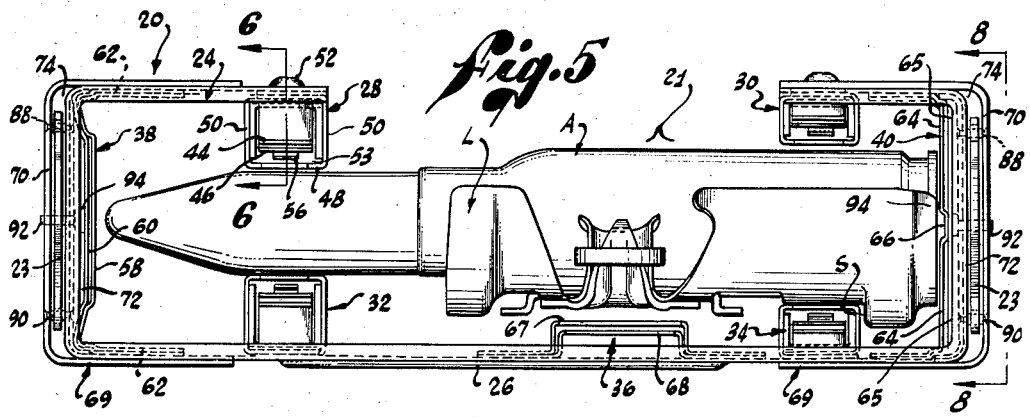
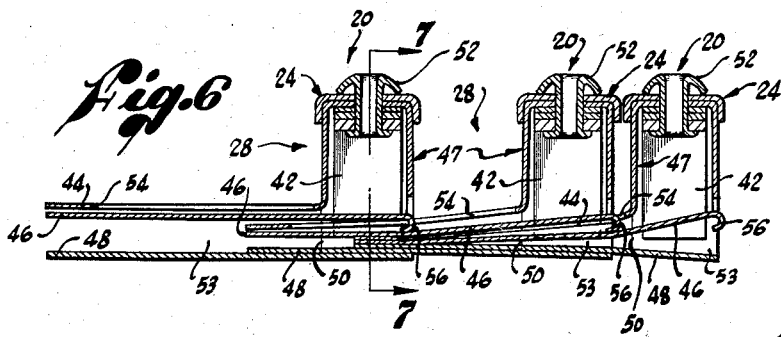
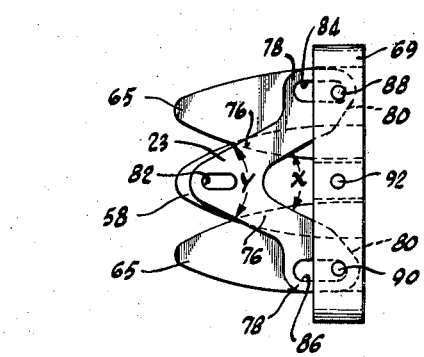
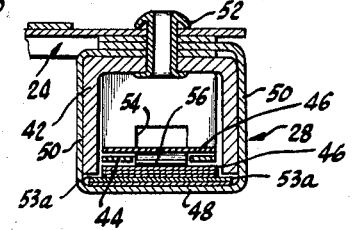
INVENTOR.
RALPH A. VAN FOSSEN
BY
ATTORNEY

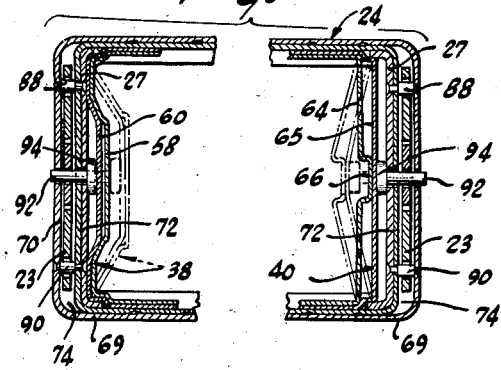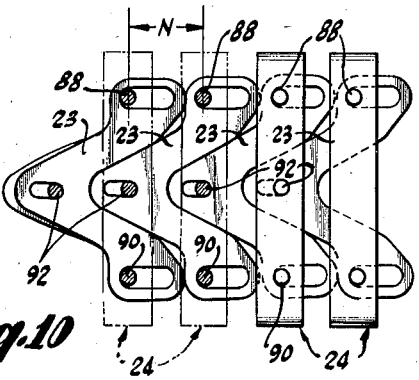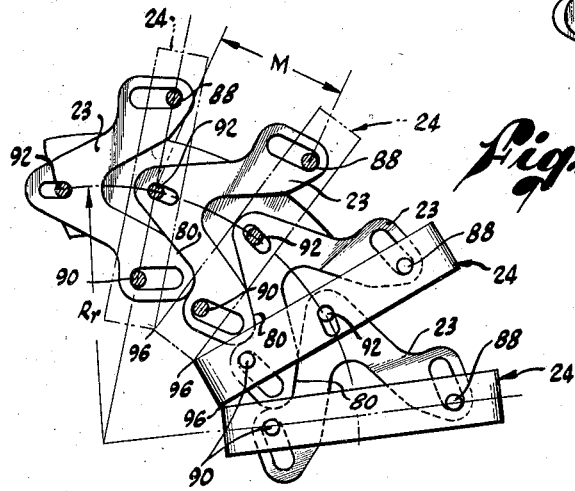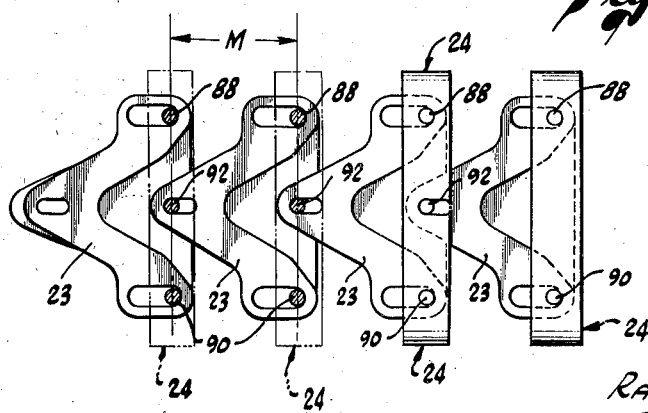

United States Patent Office 2,838,154
Patented June 10, 1958

2,838,154

FLEXIBLE CONVEYER CHUTE

Ralph A. Van Fossen, Los Angeles, Calif., assignor to Armament Components, Inc., Santa Ana, Calif., a corporation of California Application July 26, 1956, Serial No. 600,316

27 Claims. (Cl. 193—25)

This invention relates to flexible conveyer chutes and particularly to a flexible conveyer chute having accurately controlled articulation.

In certain applications and uses of articulated conveyer chutes, it is desirable or essential that the chutes be capable of substantial flexing without impeding the movement of the articles conveyed. This problem is often troublesome where the application requires the articles to be maintained in the same general attitude relative to the chute throughout their travel through the latter. For example, in the conveying of articles having other than a spherical shape to a device which operates on the articles, it is generally essential that the latter be fed into the device in a predetermined operative position relative thereto so that the device may operate properly on the articles.

An exemplary application involving the conveyance of non-spherical articles to a device in predetermined operative position relative to the latter is the feeding of articles of ammunition to a weapon, such as live rounds of ammunition to an automatic gun or rockets to a launcher. The flexible conveyer chute of this invention will be described with reference to but without limitation to such an application. Accordingly, it is to be understood that the novel features of the invention are equally well adaptable to flexible chutes for conveying other items and may be embodied in virtually any form of flexible conveyer chute wherein control of flexibility, maintenance of a given relative attitude of the article conveyed relative to the chute, and minimum frictional resistance to movement of the conveyed articles are desirable or essential.

Flexible conveyer chutes for articles of ammunition and the like are generally configured to accommodate either endwise movement of the articles, that is movement of the latter in the direction of their longitudinal axes, or lateral movement of the articles, that is movement of the latter in the direction substantially normal to their longitudinal axes. Conveyer chutes for accommodating longitudinal movement of the articles are generally cylindrical in configuration while chutes for accommodating lateral movement of the articles are generally rectangular in configuration. It will become clear as the description proceeds, that the features of this invention may be incorporated into either of these two general types of ammunition conveyer chutes. The illustrative embodiment of the invention, however, is concerned with a generally rectangular form of conveyer chute.

Certain terms have been universally adapted to denote the various modes of articulation of flexible ammunition chutes, especially rectangular chutes, and it is deemed advantageous to define these terms at the outset so as to facilitate reading and understanding of the ensuing description.

One of these modes of articulation, namely that in which a rectangular chute is flexed in the plane of its longest dimension or width, is commonly referred to as and hereinafter denoted as fan, the fan radius being the distance from the center of curvature of the chute to the proximate internal guiding surfaces of the chute which extend transverse of the plane of fan. Articulation of the chute about an axis paralleling the longest dimension or width of the chute is commonly known as, and hereinafter referred to as roll, the roll radius being measured from said axis to the center line of the passage through the chute. Articulation of the chute about its longitudinal axis is commonly known as, and hereinafter referred to as twist, the measurement of twist being the angular displacement of the chute about its longitudinal axis per unit length. It is apparent, that the chute may be simultaneously subjected to any two or all three of these modes of articulation, articulation of the chute in fan only being referred to as flat fan. As will become better understood as the description proceeds, it is essential to unimpeded movement of the articles through the chute that the minimum fan radius and roll radius, and maximum twist be accurately controlled, so as to not restrict the passage through the chute to such an extent that movement of the articles through the latter is prevented.

In addition to the above discussed modes of lateral flexibility of conveyer chutes, it is also essential in many applications that the chute be capable of limited extensibility and compressibility in a longitudinal direction so that a chute with a given number of links is accommodated to connection between a source of supply of the articles conveyed and the device to which the articles are conveyed the spacing between which may vary over a limited range. For this latter purpose, it is also desirable that the individual links of the chute be readily separable to facilitate the addition of links to or removal of links from the chute if the limited longitudinal flexibility of the latter is insufficient to accommodate connection of the chute in a given space.

An object of this invention is the provision of a flexible conveyed chute of the class described embodying new and improved coupling means which flexibly connect adjacent links for accurately controlled lateral articulation and longitudinal extension and compression and wherein the links are readily detachable for facility of removing links from or adding links to the chute.

Another object of the invention is the provision of a flexible conveyer chute of the class described which has substantial flexibility in three modes of lateral articulation, namely fan, roll and twist and two modes of longitudinal flexibility, namely compressibility and extensibility and wherein the minimum fan and roll radii, maxmum twist and extensibility and compressibility are accurately controlled by novel triangular couplers which join adjacent links of the chute.

Yet another object of the invention is the provision of a flexible conveyer chute of the class described which has substantial lateral and longitudinal flexibility while possessing the characteristics of rigidity and stiffness in any attitude or flexed condition.

Still another object of the invention is the provision of a flexible conveyer chute of the class described which possesses a substantially greater degree of longitudinal extensibility and compressibility than existing conveyer chutes of the general type and which is flexible to as much as 90 degrees in twist in a minimum overall length.

A further object of the invention is the provision of a flexible conveyer chute of the class described which is designed to withstand the extreme forces exerted on the article guiding elements of the links in arcuate portions of the chute.

Still a further object of the invention is the provision of a flexible conveyer chute of the class described which is so constructed as to facilitate design of a chute with predetermined minimum roll and fan radii, maximum twist, and longitudinal compressibility and extensibility.

Briefly the above and other objects are achieved in the illustrative embodiment of the invention by the provision of a series of rectangular links arranged in side by side fashion and defining a guide passage through which articles to be conveyed move from one end of the chute to the other. Adjacent ones of these links are joined for relative articulation by generally triangular-shaped couplers formed adjacent their apices with slots which are elongated in the longitudinal direction of the chute. Pairs of pins on each of the links are engaged in two of these slots for permanent connection of a pair of couplers to opposite ends of each link while a pair of spring loaded pins on each link are engaged in apex slots of the couplers on adjacent links for releasably securing the latter against axial separation.

The arrangement of these couplers and the longer dimensions of the coupler slots are such as to accurately limit the minimum roll and fan radii of the chute to values such that the article guiding passage through the chute is not so restricted so as to prevent movement of the articles therethrough. The length of the coupler slots accommodates substantial extensibility and compressibility of the chute in its longitudinal direction.

A novel arrangement of interfitting, overlapping shingles on adjacent links add substantial stiffness to the chute in all of its conditions of fan, roll and twist and embody novel camming leaves which permit a substantially greater minimum roll radius and longitudinal elongation of the chute than heretofore possible. These overlapping shingles, which form guiding surfaces for the articles conveyed, are reinforced in a novel manner to prevent collapse thereof under the extreme centrifugal forces exerted thereon in arcuate portions of the chute when the articles are conveyed at a high speed through the latter. Separation of the links, to permit removal and insertion of links to and from the chute, is readily accomplished by depression of the spring loaded coupling pins to disengage such pins from the slots in the couplers.

As preliminarily discussed, the features of this invention may be embodied in flexible conveyer chutes for conveying numerous different types of articles, and, accordingly, the invention should be thought of as having a general application to all types of flexible conveyer chutes. For facility of description and understanding of the invention, however, the latter will be disclosed with reference to a flexible rectangular chute, for conveying articles of ammunition, illustrated in the accompanying drawings wherein:

Fig. 4 is an enlarged top plan view of one of the links comprising the chute of Figs. 1–3;

Fig. 5 is a view in elevation of the link of Fig. 4;

Fig. 6 is an enlarged section taken substantially along line 6—6 of Fig. 5 but showing a series of interconnected adjacent links;

Fig. 7 is a section taken along line 7—7 of Fig. 6;

Fig. 8 is a view looking in the direction of the arrows on line 8—8 of Fig. 5;

Fig. 9 is a partial section through the link of Fig. 4 illustrating certain features of its construction; and Figs. 10–12 illustrate the manner in which the novel couplers of the invention control articulation of the present chute.

In general, the illustrative embodiment of the invention comprises a plurality of identical links 20 of generally rectangular shape provided internally with guide surfaces defining a guideway 21 through the chute substantially configured in accordance with the contour of the articles conveyed, namely, a round of ammunition in the illustrative chute. Adjacent ones of the links 20 are provided with interengaging, flexible leaves or shingles, generally designated at 22, which, in the illustrative embodiment of the present chute, form the above-mentioned guide surfaces. These flexible shingles, while accommodating the various modes of articulation of the chute, namely fan, roll and twist, as well as longitudinal extension and compression of the chute, lend rigidity and stiffness to the chute in all of its attitudes and conditions of flexure so as to assure a chute which is flexible and yet rigid in construction and capable of withstanding the extreme operating conditions present in some operational environments such as aircraft applications.

The several links 20 are interconnected against separation by generally triangular shaped couplers 23 located at opposite sides of the chute. These triangular couplers are of novel design and serve to limit the maximum roll, fan, and twist as well as longitudinal extension and compression of the chute to such extreme limits as will insure free movement of the articles conveyed through the guideway 21.

Figure 1:
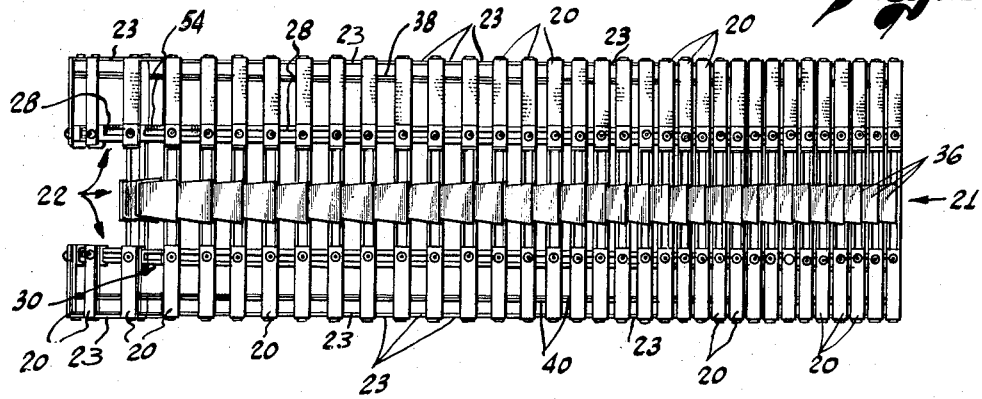
Fig. 1 is a top plane view of an illustrative embodiment of the present flexible conveyer chute.
Figure 2:
Fig. 2 is a side elevation of the chute of Fig. 1 illustrating a portion of chute flexed in roll.
Figure 3:
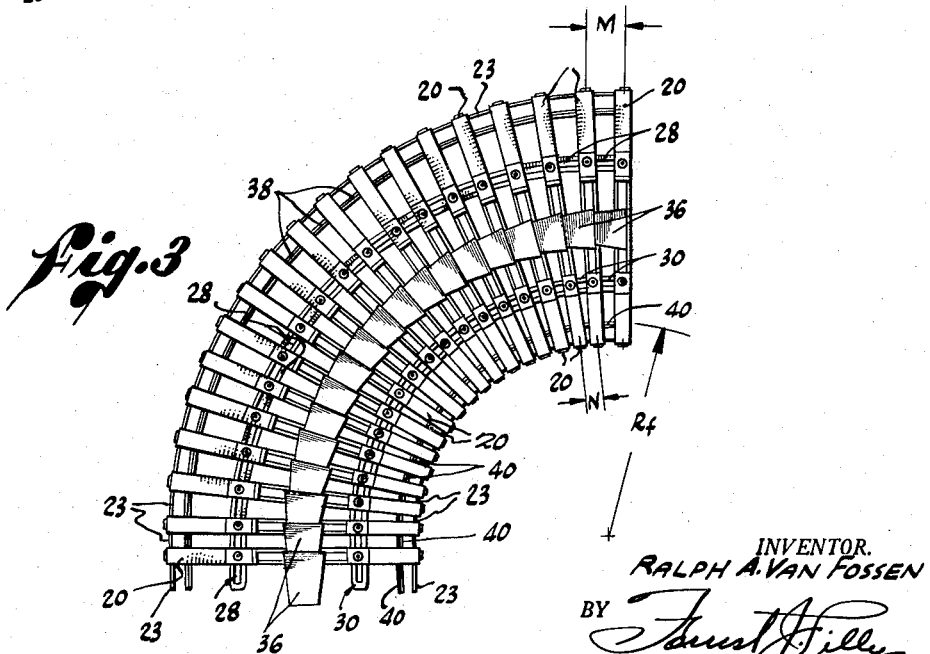
Fig. 3 is a top plan view of the present chute and showing the latter flexed in fan.

Referring now to Figs. 4–9 illustrating with greater clarity the links 20 which comprise the feed chute of Figs. 1–3, the numeral 24 indicates a basic frame element of each of the links 20. The frame element 24 has a channel shaped cross section and is folded along spaced lines into a generally rectangular, C-shaped configuration, as shown. The spacing between the terminal ends of the frame element 24 accommodates insertion of an operator's hand into the guideway 21 of the conveyer chute for manual advancing of the articles of ammunition as is necessary, for example, during loading of a weapon system. The lower lateral portion of the frame element 24 may be outwardly embossed with a reinforcing rib 26 to lend rigidity to the link. Reinforcing yokes 27 are welded or otherwise fixed in opposite ends of the frame 24 for reinforcing of the latter against bending in the plane of the paper. Obviously, complete rectangular links or "closed links" may be employed in lieu of such open links.

Indicated at 28, 30, 32, and 34 are shingle assemblies including the previously mentioned flexible leaves 22. These assemblies are constructed as described below and located, as shown most clearly in Fig. 5, so as to be engageable with opposite sides of the articles of ammunition conveyed, adjacent the nose and butt ends of the latter. An additional shingle assembly 36, including flexible leaves, is secured to the lower lateral portion of the frame element 24 intermediate the shingle assemblies 32 and 34 so as to be engageable with surface portions of the links L which interconnect the articles of ammunition A into a belt. Additional shingle assemblies 38 and 40 are secured to the vertical end portions of the frame element 24 and include flexible leaves, as described below.

As will be observed from Fig. 5, these several shingle assemblies 28–40 on the several links provide the guideway 21 with a cross sectional configuration conforming substantially to the contour of the articles of ammunition A so that the conveyer chute is adapted for movement of the articles A therethrough in a direction normal to their longitudinal axes.

The shingle assemblies 28, 30, 32 and 34 are substantially identical and differ only in their vertical dimensions, as viewed in the drawings. Accordingly, only one of these latter shingle assemblies, namely assembly 28, will be described in detail, it being understood that the following description thereof applies equally well to the other guiding structures 30, 32 and 34 except as to vertical dimension.

The shingle assembly 28 comprises an inner reinforcing saddle 42 (see Figs. 6 and 7) of generally U-shaped configuration, having its web portion parallel to the web of the channel of the frame 24 and its two legs extending normal to the frame web in longitudinal planes of the chute. A first pair of slightly spaced, parallel flexible leaves 44 and 46 are formed by opposite end portions of a strip of flexible material, such as spring steel, an intermediate portion of which strip is formed into a generally rectangular box section 47, shown most clearly in Fig. 6 and wrapped around the web of saddle 42 and tabs 50 on a third flexible leaf or shingle 48 in a longitudinal plane of the chute. The leaves 44 and 46 extend in a direction opposite to the direction of movement of the articles through the chute.

The third leaf 48 of the shingle assembly 28 extends in spaced, parallelism with the leaves 44 and 46 and has its laterally extending tabs 50, shown most clearly in Fig. 7, folded into a box section and wrapped around the reinforcing saddle 42 in the plane of the frame 24. The ends of the tabs 50 overlap between the web of the saddle and the upper leg of box section 47, as shown, and a rivet 52 passes through the frame 24, said upper leg of box section 47, the overlapping ends of the tabs 50, and the web of the reinforcing saddle 42, to secure these parts into a rigid, unitary assembly. As indicated above, shingle assembly 32 is identical to assembly 28 just described and shingle assemblies 30 and 34 differ from assembly 28 only in their vertical dimensions, as viewed in the drawing, so that no further description thereof is thought necessary. The vertical spacing between the shingle assemblies 28 and 32 is slightly greater than the diameter of the nose portion of the round A while the spacing between the shingle assemblies 30 and 34 is slightly greater than the diameter of the case of the round, the inner leaves of these assemblies providing guiding surfaces for the rounds.

The space or pocket 53 between the leaves 46 and 48 in each of the shingle assemblies 28–34 on one link receives the leaves 44, 46 and 48 of the corresponding shingle assembly on an adjacent link in the assembled condition of the links, as shown most clearly in Fig. 6, the leaves or shingles 48 on the adjacent links being received in spaces 53a between the legs of the saddles 42 on the one link and the shingles 48 on the latter link. When the links are compressed or extended, as shown in Fig. 6, the shingles 48 on both the adjacent link and alternate link overlap and are interleaved in the spaces 53a in the one link.

The saddles 42 reinforce the shingle assemblies against deformation under compressive forces exerted by the articles conveyed while the interleaving of shingles 48 on adjacent links within the restricted spaces 53a reinforces the shingles 48 against deformation under continued flexing of the chute in roll, fan, twist, extension and compression.

It is obviously of extreme importance that the shingle assemblies, and especially the shingles 48 which furnish guiding surfaces for the articles conveyed, be not deformed in order that predetermined clearances may be maintained between the opposing shingle assemblies 28, 32 and 30, 34 to assure proper guiding of the articles.

The several leaves 44 are longitudinally slotted at 54 and the several leaves 46 have hooks 56 punched therefrom which project downwardly into their respective pockets 53. These hooks engage in the slots 54 in the leaves 44 on the adjacent link to prevent removal of the leaves on one link from the pockets 53 in the adjacent link, when chute is in tight roll radius attitude. As noted the hooks 56 engage the outer end of slots 54 only when the chute is in tight roll radius and do not contribute to control of roll radius, flat fan or extensibility. The hook and slot feature are added only to prevent shingles of adjacent links from pulling out of spaces 53 and 53a under stress during passage of articles from link to link while chute is in tight roll radius.

The clearance between the hooks 56 and their adjacent leaves 48 is such as to permit disengagement of the slotted leaves 44 from the hooks 56 by depression of the slotted leaves toward the adjacent leaves 48. As shown in Fig. 4, the several leaves 44, 46, and 48 are slightly tapered to accommodate angular movement of the leaves on one link in the pockets 53 of an adjacent link during articulation of the chute in fan.

The left hand or nose shingle assembly 38 comprises a pair of leaves 58 and 60 having laterally extending tabs 62 which are folded at right angles to the leaves 58 and 60 and welded or otherwise rigidly secured to the laterally extending, left hand end portions of the frame element 24 as shown in Figs. 4 and 5. The leaves 58 and 60 are slightly spaced, as shown, for receipt of the leaves 58 and 60 on an adjacent link therebetween and have their opposite edges converging toward a reduced, somewhat rounded end to accommodate arcuate movement of the leaves 58 and 60 on one link between these leaves on the adjacent link during flexing of the chute in roll.

The right hand or butt shingle assembly 40 comprises pairs of leaves 64 and 65 similar in shape to the leaves 58 and 60 formed with lateral tabs which are bent at right angles to the plane of the leaves 64 and 65 and welded or otherwise firmly secured to the laterally extending, right hand end portions of the frame element 24, as shown in Fig. 9. The metal strips comprising the leaves 64 and 65, between the pairs thereof, is depressed to provide a recess 66 alined with the percussion cap on the rounds of ammunition to eliminate the possibility of metallic contact between the chute and said cap for safety reasons. In assembled condition the leaves 64 and 65 on one link are received between the leaves 64 and 65 on the adjacent link.

Finally, the shingle assembly 36 comprises a pair of spaced leaves 67 and 68 formed with lateral tabs, as shown, welded or otherwise secured to the lower lateral portion of the frame element 24 between the shingle assemblies 32 and 34. In assembled condition of the links, the leaves 67 and 68 on one link are received between the leaves 67 and 68 on the adjacent link, and the inner leaves 68 form guiding surfaces engageable with the ammunition links L. These latter links include butt end guide shoulders S which cooperate with the shingle assemblies 34 to limit left hand movement of the rounds A to the extreme position shown wherein the nose ends of the rounds are spaced from the shingle assemblies 38. This spacing is maintained to eliminate the possibility of detonation of the explosive nose charges contained in certain types of ammunition. The principal function of shingle assembly 36 when incorporated into a chute is that of a camming member. Thus, frequently the links L of belted ammunition are inaccurately assembled on the rounds A and unless properly compressed and positioned with relation to the axis of the rounds the latter will not enter feeder mechanism of the weapon or will catch on the link frames 24 or structural elements of intermediate link adapters (not illustrated). The shingle assemblies 36 are provided to avoid such occurrences by camming the ammunition links L into proper positions on the rounds A in the well known manner.

Exteriorly secured to opposite ends of the frame element 24 are a pair of generally U-shaped brackets 69 having vertical web portions 70 parallel to and spaced from the vertical ends 72 of the frame element 24, as shown, to define at each end of the frame element a space or pocket 74 in which the couplers 23 are loosely received.

The couplers 23 are identical and each is of generally V-shaped configuration (see Fig. 8) to define a pair of divergent legs 76 with enlarged end portions 78 which have their inner edges beveled slightly at 80. The inner and outer edges of the apices of the couplers are rounded to substantially the same radius, as shown, while the included angle X between the inner edges of the coupler legs 78 is substantially equal to or slightly greater than the included angle Y between the outer edges of the legs so that the apex of one coupler may be nicely fitted into the V of an adjacent coupler. The apex and the enlarged ends 78 of the couplers are formed with parallel slots designated by the numerals 82, 84 and 86, the slots 84 and 86 being somewhat longer and wider than slot 82.

A pair of couplers are secured to each of the links 20 within the pockets 74 by means of coupling pins 88 and 90 rigidly and permanently fixed in the brackets 69 and the vertical ends 72 of the frames 24 and passing through the slots 84 and 86, respectively, in the couplers. In the assembled condition of the several links to form a conveyer chute, the couplers on each link have their apices extending into the pockets 74 on an adjacent link and are attached to the adjacent link by means of coupling pins 92 slidably fitted in alined bores, on the center line of the guideway 21, in the brackets 69 and the vertical ends 72 of the latter link. Each of these pins 92 has an inner enlarged head 94 bearing against the leaves of the assembly 38 and 40 (see Fig. 9) for retention of the pins 92 in position to lock the links against separation.

Detachment of adjacent links to accommodate the addition of links to or removal of links from the chute to vary the length of the latter, is accomplished by inward depression of the pins 92 against their respective shingle assemblies 38 and 40. The shingle assemblies are inwardly bowed under this pressure to allow inward movement of the pins 92 to clear the couplers 23 as shown most clearly in Fig. 9. This inward bowing of the shingle assemblies 38 and 40 is accommodated by the fact of their construction of flexible material, such as spring steel, and the spaced points of attachment thereof to the frame element 24, as previously described. Thus, the shingle assemblies 38 and 40 serve as biasing springs for the respective coupling pins 92 to retain the latter in their outward extended position wherein they lock the couplers and links against separation.

Referring now to Figs. 10–12, it will be seen that relative extensile and contractile movement of the links 20 of the conveyer chute longitudinally of the latter to extend or shorten the length of the chute is accommodated by the elongation of the slots 82, 84 and 86, extension of the chute being determined by the length of the slots and contraction of the chute being regulated by the length of the slots as well as by movement of the couplers 23 on adjacent links into nesting abutment as illustrated in Fig. 11.

The couplers 23 also serve to limit the minimum roll radius of the chute as may be observed in Fig. 10, wherein adjacent links are illustrated as being articulated in roll to their extreme limit. In this extreme roll condition the radially inner lateral edges of adjacent frame elements 24 abut as shown at 96, the spacing M between centers at opposite ends of the apex slot 82 and the leg slots 84 and 86 in the couplers being made such as to limit the minimum roll radius $R_r$, measured from the center of curvature of the chute to the center line of the chute guideway 21, to the desired value. In such extreme roll condition, the beveled edges 80 on the radially inner legs of the couplers bear flatly against the outer edges of the adjacent couplers, as shown, to prevent lateral displacement of adjacent links. During articulation of the chute in roll, the leaves of the shingle assemblies 28—36 are arcuately flexed (Fig. 2) while the leaves of the shingle assemblies 38 and 40 on each link remain unflexed and are angulated in their plane relative to these shingles on the adjacent links. These interfitting leaves lend lateral rigidity and stiffness to the chute in all conditions of flexure of the latter.

It will be observed in Fig. 12 that the dimension M also determines the maximum longitudinal extension or separation of adjacent links. Longitudinal compressibility of the chute is limited, as shown most clearly in Fig. 11, by engagement of the rounded apices of the couplers on one link in the rounded V's of the coupler on the adjacent link as well as by engagement of the coupling pins 88, 90 and 92 with the ends of their respective coupler slots. The spacing, longitudinally of the chute, between the coupler pins on adjacent links in this compressed condition of the chute has been designated by the letter N so that the percentage extensibility of the chute is N/M.

Referring to Fig. 3, it will be seen that the couplers 23 also limit flexing of the chute in fan. Thus, in the extreme condition of fan, the radially inner ends of the links will be compressed to their extreme limit corresponding to the spacing N (Fig. 11) between the coupling pins of adjacent links, while the radially outer ends of adjacent links will be longitudinally extended to their extreme limit corresponding to the spacing M (Fig. 12) between the coupling pins of adjacent links. The dimensions M and N will be made such as to achieve a desired minimum fan radius $R_f$ of the conveyer chute. During articulation of the chute in flat fan, the leaves of the nose and breech shingle assemblies 38 and 40 will be flexed while the leaves of the shingle assemblies 28—36 will remain unflexed and be angulated in their plane relative to these assemblies on adjacent links so as to lend lateral rigidity and stiffness to the chute.

Articulation of the conveyer chute in twist is limited by the flexibility of the frame elements 24 and by the clearance between the couplers 23 and their adjacent bracket webs 70 and frame ends 72. Thus, when the conveyer chute is flexed in twist, the couplers are angulated in their respective pockets 74 to engage along one edge the bracket webs 70 and along the opposite edge the vertical ends 72 of the frame elements 24 to limit the twist.

It will be seen that by choosing proper values to the dimensions M and N, desired minimum fan and roll radii may be achieved. Thus, in designing a chute of desired minimum roll and fan radii, by a graphical method, for example, and assuming the width and height dimensions of the links to be determined by the size and configuration of the article to be conveyed and the thickness of the links longitudinally of the chute as well as the positioning of the center coupling pins 92 and the pins 88 and 90 on the links to be arbitrarily chosen, adjacent links will be laid out as shown in Fig. 10 so as to have their center coupler pins 92 lie on a common circle of minimum desired roll radius $R_r$ and their coupler pins 88 and 90 lie on common radii of the circle and with the radially inner lateral edges of adjacent links abutting at 96. The dimension M is thereby determined. Adjacent links are now graphically laid out in articulated positions of fan with a spacing M between the coupling pins 88 (or 90) on adjacent links, at the radially outer edges of the links. The axially compressed dimension N between the coupling pins 88 (or 90) on adjacent links at the radially inner ends of the latter is now set to yield the desired minimum fan radius $R_f$ measured from a center at the intersection of the radii on which the coupling pins 88 and 90 lie and to a circle tangent to the adjacent radially inner guide surfaces formed by the leaves of the radially inner shingle assemblies 38 or 40 as the case may be. The percentage extensibility of the chute is now determined, as just described, and is equal to N/M. The clearance space between the couplers 23 and the brackets 70 and vertical ends 72 of the frame elements 24 is made such as to achieve approximately the desired maximum twist in the chute in a given length thereof.

Finally the slots 82, 84 and 86 are laid out to have a length determined by the difference between the dimensions M and N.

Referring to Figs. 11 and 12, it will be seen that the longitudinal extensibility and compressibility of the chute is substantially greater than in existing chutes and is, in fact, such (Fig. 6) that the slotted leaves 44 in the shingle assemblies 28, 30, 32 and 34 on one link, in the compressed condition of the chute, extend beyond the hooks 56 on an alternate link beyond the adjacent link. Accordingly, the intermediate leaves 46, forming camming leaves, are provided in the shingle assemblies 28–34 to prevent engagement of the hooks 56 and slotted leaves 44 of alternate links, which engagement would, obviously, prevent longitudinal extension of the chute. Thus, the camming leaves 46 are positioned between the hooks 56 and the slotted leaves 44 on alternate links in the compressed condition of the conveyer chute, so as to prevent this engagement.

In the conveying of rounds of ammunition, the latter move through the chute at extremely high speed, and at arcuate portions of the chute, the rounds exert substantial centrifugal forces on the shingle assemblies 28, 30 or 32, 34 at the outer periphery of the curvature. In order to prevent collapse of the shingle assemblies under these forces, the reinforcing saddles 42 are provided to reinforce the assemblies against crushing.

It will be apparent from the following description that there has been described and illustrated a conveyer chute which is fully capable of attaining the objects and advantages preliminarily set forth. While a present preferred embodiment of the invention has been disclosed for illustrative purposes, it should be understood that numerous modifications in design and arrangement of parts is possible within the scope of the following claims.

I claim:

1. A flexible conveyer chute comprising a plurality of hollow links spaced lengthwise of the chute and defining a guideway for guiding articles to be conveyed, a set of couplers extending between adjacent links, connecting means between the couplers and links, said connecting means comprising connecting elements operatively engaged with the respective couplers and links, said elements associated with each coupler being arranged in a generally triangular pattern, and said connecting means accommodating limited longitudinal and angular movement between the couplers and each of the adjacent links between which the respective couplers extend whereby said chute is capable of controlled angular and longitudinal adjustment.

2. A flexible conveyor chute comprising a plurality of hollow links spaced lengthwise of the chute and having internal guiding surfaces defining a guideway through the chute for guiding articles to be conveyed, a set of couplers extending between each pair of adjacent links, three coacting connecting means securing each coupler to its respective adjacent links and arranged in generally triangular pattern with two of the connecting means associated with each coupler extending between the latter and one of its respective links and the third connecting means associated with each coupler extending between the latter and its other respective adjacent link, said connecting means accommodating limited relative angular movement of the couplers and links in planes paralleling the longitudinal axis of the chute to permit lateral articulation of the latter and accommodating limited relative movement of the couplers and links longitudinally of the chute to permit adjustment of the length of the latter.

3. The subject matter of claim 2 wherein said connecting means comprise coupling elements carried on the links and engaging in longitudinally elongated openings in the couplers.

4. The subject matter of claim 2 wherein at least one of said connecting means associated with each coupler are designed for manual releasing of the latter from one of its respective adjacent links to accommodate removal of links from and addition of links to the chute.

5. A flexible conveyer chute comprising a plurality of hollow links spaced lengthwise of the chute and having internal guiding surfaces defining a guideway through the chute for guiding articles to be conveyed, a set of couplers extending between each pair of adjacent links, each of said couplers having three substantially parallel slots extending generally longitudinally of the chute and arranged at the apices of a triangle, coupling pins on the links engaging in the coupler slots for securing the couplers to their respective adjacent links, said pins being capable of movement lengthwise of the slots whereby the chute is adapted for lateral articulation and longitudinal extension and contraction.

6. The subject matter of claim 5 wherein said couplers are substantially V-shape and have one of said slots at the apex of the V and the other slots at the ends of the legs of the V, one of the coupling pins associated with each coupler being on one of the adjacent links associated with the respective couplers and having its axis substantially intersecting the center line of said guideway and engaging in the apex slot of its respective coupler, the two remaining coupling pins associated with each coupler being on the other one of the adjacent links associated with the respective couplers and engaging in the leg slots of the latter, said two remaining coupling pins on each link being offset to opposite sides of said center line, said couplers having their apices pointed in the same direction for nesting of the couplers in the collapsed condition of the chute.

7. The subject matter of claim 6 wherein corresponding legs of adjacent couplers abut when the chute is flexed to its limit to lend lateral rigidity and stiffness to the chute.

8. In a flexible conveyer chute of the class described, a pair of hollow links having internal guiding surfaces defining a guideway through the links, means for connecting said links for relative articulation thereof comprising a pin on one of said links, a pair of pins on the other link, and a coupler having parallel slots receiving said pins and arranged in a generally triangular pattern.

9. The subject matter of claim 8 wherein the first mentioned pin has its axis substantially intersecting the center line of the guideway and the two last mentioned pins have parallel axes offset to opposite sides of said center line.

10. The subject matter of claim 8 wherein at least one of said pins is releasable from its slot to permit disconnection of the links.

11. A flexible conveyer chute comprising a plurality of hollow links spaced lengthwise of the chute and defining a guideway for articles to be conveyed, at least one set of resiliently flexible leaves on each link extending longitudinally of the chute and interleaved between the leaves of the adjacent link for lending lateral rigidity and stiffness to the chute, one leaf of each set being slotted longitudinally of the chute, hook means on each link engageable in the slotted leaf of an adjacent link to limit complete separation of the leaves on adjacent links, coupler means connecting said links for relative movement of the links longitudinally of the chute, the extent of said relative longitudinal movement being such that the slotted leaf on one link extends beyond the hook means on an alternate link when the links are moved together, and each of said set of leaves including a camming leaf substantially coextensive with its adjacent slotted leaf and located between the latter leaf and the slotted leaf on the adjacent link in a direction opposite to the direction in which said leaves extend.

12. The subject matter of claim 11 wherein some of said leaves form guiding surfaces in said guideway.

13. The subject matter of claim 12 including additional sets of said leaves arranged about the guideway forming additional guiding surfaces for the latter and additional hook means on the links for engagement in the slotted leaves of said additional sets.

14. In a flexible conveyer chute, at least three hollow articulated links spaced lengthwise of the chute and defining a guideway therethrough, at least one set of resiliently flexible leaves on each link extending longitudinally of the guideway, the leaves on an outside one of said three links being interleaved between the leaves on the center link and the leaves on the latter link being interleaved between the leaves of the other outside link, one leaf of at least said one outside link and said center link being longitudinally slotted and a hook on at least each of said center link and other outside link engaging in the slotted leaves of the one outside link and center link respectively whereby said links are flexibly interconnected, and at least said sets of leaves on the other outside link and center link each including a camming leaf substantially coextensive with the slotted leaf of the respective links and located between the latter leaf and the slotted leaf on the adjacent link in the direction opposite to the direction in which the leaves extend.

15. A flexible conveyer chute comprising a plurality of hollow articulated links spaced lengthwise of the chute and defining a guideway for articles to be conveyed, coupling means connecting adjacent links for relative lateral articulation and longitudinal adjustment thereof, said coupling means including couplers extending between adjacent links, coupling pins carried on the links and engaging in holes in the couplers for attachment of the latter to the links, and sets of resiliently flexible, overlapping leaves on adjacent links, one of said sets being located proximate to at least one of said pins associated with each link, and said one pin being movable in its respective link to permit disengagement from its respective coupler and being engaged with the proximate set of flexible leaves for resilient retention of said one pin in operative engagement with its respective coupler whereby separation of the links may be accomplished by depression of said one pin associated with each coupler against the action of its proximate set of flexible leaves.

16. A flexible conveyer chute comprising a plurality of hollow links defining a guideway through the chute, said links having generally rectangular configurations in planes normal to the length of the guideway, couplers at opposite ends of the links extending between adjacent links, connecting elements on the links engaging in substantially parallel slots in the adjacent couplers for interconnection of the several links of the chute, said slots in each coupler extending generally longitudinally of the chute and being arranged in a generally triangular pattern, the length of said slots being such as to accommodate limited relative angular movement of adjacent links and limited relative movement of adjacent links longitudinally of the chute.

17. The subject matter of claim 16 wherein said couplers are generally V-shaped and have one of said slots at the apex of the V and the other slots at the ends of the legs of the V, the apices of the couplers being pointed in the same direction longitudinally of the chute for nesting of the couplers when the chute is longitudinally compressed.

18. The subject matter of claim 17 wherein the connecting elements engaging in the apex slots in the couplers are on one link and have axes substantially intersecting the center line of said guideway and the connecting elements engageable in the leg slots of the couplers are on adjacent links and have substantially parallel axes offset to opposite sides of said center line.

19. The subject matter of claim 16 including sets of overlapping, longitudinally extending leaves of resiliently flexible construction on adjacent links and forming guiding surfaces of said guideway, one set of said leaves being located at each of said opposite ends of each link and being secured to their respective links for inward flexing, at least one of said connecting elements at each of said opposite ends of the links being supported in its respective link for inward movement out of engagement with its respective coupler, said sets of leaves at opposite ends of the links engaging said movable pins to resiliently retain the latter in operative engagement with their respective couplers.

20. A flexible conveyer chute for conveying rounds of ammunition in a direction normal to their longitudinal axes, comprising a series of links interconnected for relative articulation, sets of overlapping flexible leaves on adjacent links extending longitudinally of the chute at least some of which have guiding surfaces defining a guideway for the rounds, one of said sets being engageable with the butt ends of the rounds, and said one set being recessed on the center line of the guideway in alinement with the firing caps of the rounds whereby to prevent metallic contact with such caps.

21. The subject matter of claim 20 wherein the chute is adapted for conveying belted ammunition, and one of said sets of leaves on each link being located to engage the links which form the ammunition belt to limit axial movement of the rounds in the guideway to positions wherein the nose ends of the rounds are spaced from the adjacent ends of the links.

22. A flexible conveyer chute comprising a plurality of links spaced lengthwise of the chute and defining a guideway through which articles to be conveyed are adapted to move, coupling means connecting adjacent links for relative articulation and longitudinal compression and extension of the chute, a series of shingle assemblies on each link longitudinally alined with corresponding shingle assemblies on adjacent links, each assembly comprising a flexible leaf extending longitudinally of said guideway and toward an adjacent link and overlapping the leaf of the alined shingle assembly on the adjacent link, said leaves having inner guiding surfaces in said guideway, each assembly further comprising generally U-shaped reinforcing saddles between its respective leaf and link and including legs extending inwardly of the guideway toward the latter leaf, said saddles reinforcing the assemblies and especially said leaves of the assemblies against outward collapse under forces exerted thereon by the articles conveyed and said legs of the saddles being spaced to receive therebetween the flexible leaves of the alined shingle assemblies on the adjacent links.

23. The subject matter of claim 22 wherein said leaf of each assembly is received between the inner ends of the saddle legs and said leaf of the alined assembly on the adjacent link whereby said leaves of the assemblies are reinforced against deformation under continued flexing of the chute.

24. The subject matter of claim 23 wherein the spacing between the legs of the saddle in each assembly and said leaf of that assembly is approximately twice the thickness of said leaf, whereby said spacings on a given link are adapted to have interleaved therein said leaves in alined assemblies of the adjacent link and the alternate link when the links are longitudinally compressed.

25. A coupler for a flexible conveyer chute of the class described, comprising: a substantially V-shaped member of rigid material formed adjacent its apex and the ends of its divergent legs with slots substantially parallel to the center line of the V of member.

26. The subject matter of claim 25 wherein said slots in the legs of the members are laterally alined and have substantially the same length and width.

27. The subject matter of claim 25 wherein the included angles between the iner edges and the outer edges of said legs are substantially equal whereby a plurality of said members may be nested in end to end fashion.

References Cited in the file of this patent

UNITED STATES PATENTS

| | | |
|---|---|---|
| 1,199,198 | Martin | Sept. 26, 1916 |
| 2,488,679 | Nobles | Nov. 22, 1949 |
| 2,740,180 | Nobles | Apr. 3, 1956 |